Sept. 23, 1958 C. B. SPASE 2,853,168
SELF COOLING POWER TRANSMISSION DEVICE
Filed Feb. 14, 1957 2 Sheets-Sheet 1

INVENTOR.
Charles B. Spase
BY
D. Emmett Thompson
ATTORNEY.

Sept. 23, 1958      C. B. SPASE      2,853,168
SELF COOLING POWER TRANSMISSION DEVICE
Filed Feb. 14, 1957      2 Sheets-Sheet 2
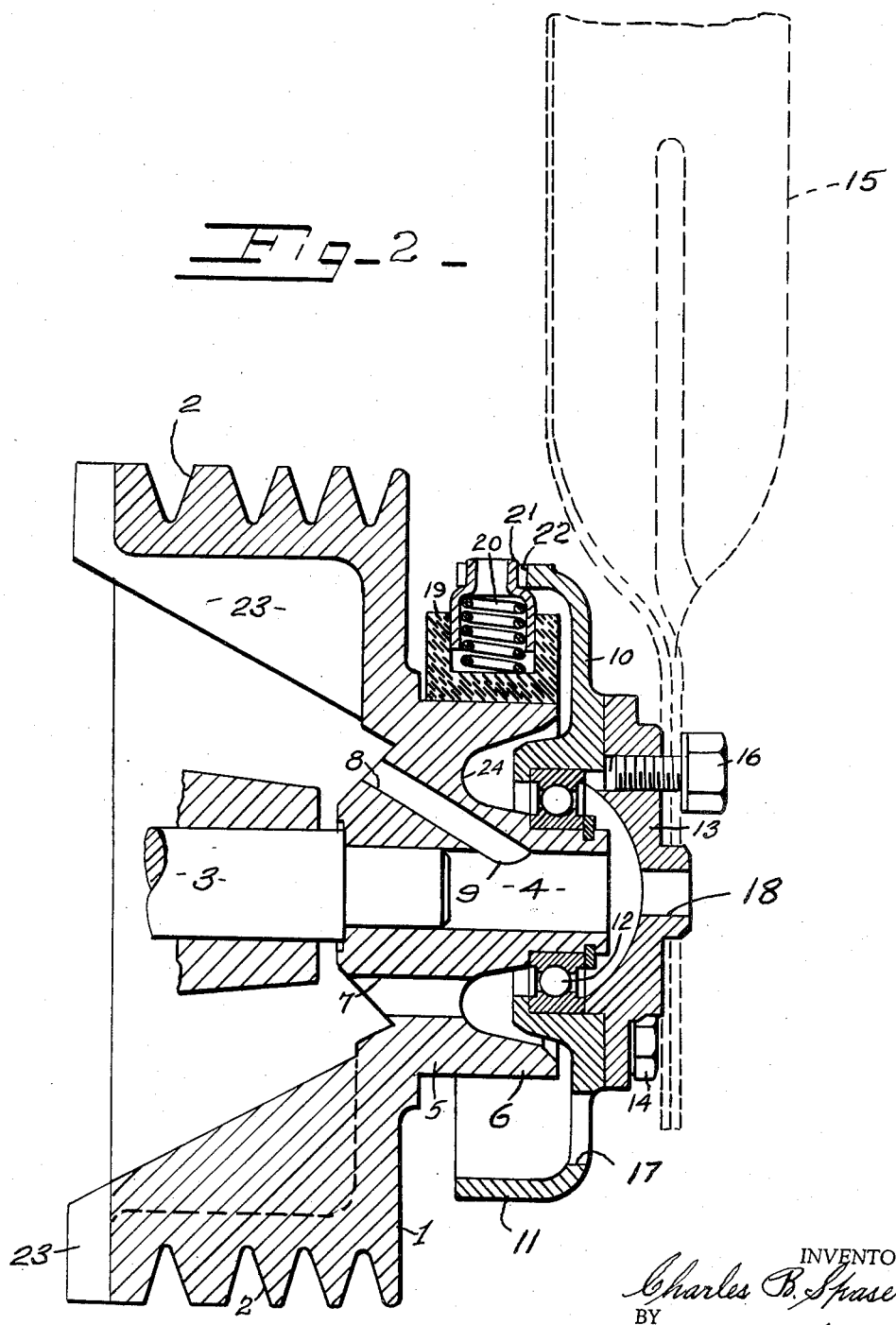
INVENTOR.
Charles B. Spase.
BY
Emmett Thompson
ATTORNEY.

United States Patent Office 2,853,168
Patented Sept. 23, 1958

2,853,168
SELF COOLING POWER TRANSMISSION DEVICE

Charles B. Spase, Syracuse, N. Y., assignor to Lipe-Rollway Corporation, Syracuse, N. Y., a corporation of New York Application February 14, 1957, Serial No. 640,232

5 Claims. (Cl. 192—104)

This invention relates to torque metering and speed limiting clutches for use especially for driving automobile accessories by the engine. Such clutches are used to control the speed of such accessories and to operate the same under varying load demands with present day high speed engines and car speeds. These clutches in operation at high car speeds generate great amounts of heat due to the slippage between the drive and driven members.

This invention has as an object a torque metering and speed limiting clutch embodying a structural arrangement whereby heat is dissipated rapidly from the friction elements of the clutch whereby, other elements of the clutch, particularly the bearings, are maintained at a safe operating temperature.

The invention consists in the novel features and in the combinations and constructions hereinafter set forth and claimed.

In describing this invention, reference is had to the accompanying drawings in which like characters designate corresponding parts in all the views.

In the drawings:

Figure 2 is a section taken on line 2—2, of Figure 1.

Figure 1:
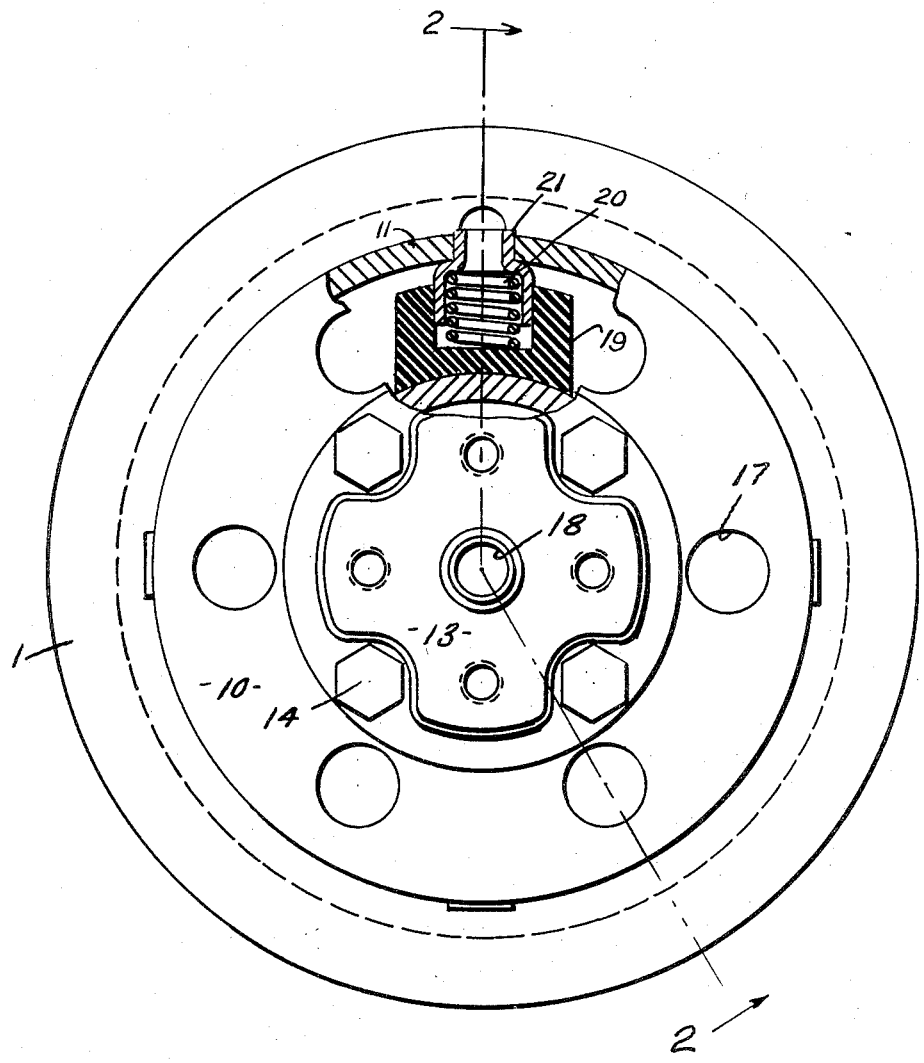
Figure 1 is a front plan view, partly in section, of the assembled device.

In the drawings, 1 is a driving member operatively connected to the automobile engine, for example, by means of a pulley belt received in one of the annular belt receiving grooves 2 of the driving member. The driving member, as here shown, has a press fit with an accessory shaft 3, such as a pump shaft, for example, for operating the water pump of an automobile. The forward portion of the shaft 3 is received in a central bore or opening 4 in the hub portion 5 of the driving member. The driving member also has a drum surface 6 for a purpose hereinafter described. Circumferentially spaced and in concentric relation wtih the central bore 4 is a pair of bores 7 spaced 180° apart. There is further provided a pair of passages 8 spaced 180° apart and approximately 45° out of phase with the bores 7. The passages 8 intersect, as at 9, the central bore 4 obliquely thereto. A driven member 10 has a flange 11 which encircles the drum surface 6 of the driving member. This driven member 10 is journalled on bearings 12 carried on a forwardly extending portion of the hub portion of the driving member. A cap or plate 13 is mounted on the driven member by a plurality of fasteners 14. Shown in hidden lines in Figure 2 is a fan 15 mounted on the plate 13 by a plurality of fasteners 16.

The driven member 10 has a plurality of ventilating apertures 17 and the mounting plate 13 has a central ventilating hole 18. A frictional engagement is effected between the driving member 1 and the driven member 10 by means of a plurality of friction shoes 19. The shoes are forced into engagement with the drum surface 6 by means of a plurality of springs 20 carried by a plurality of spring holders 21 which are received in slots 22 in the flange 11 of the driven member. The driving member has a plurality of vanes 23 to be utilized for a purpose hereinafter described.

In operation, the shoes 19 effect a frictional engagement between the driven member 10 and the driving member 1 by means of the springs 20 and the spring holders 21, which are received in the slots 22 in the flange 11. As the driving member rotates and reaches a predetermined speed, centrifugal force acting upon the shoes and springs will decrease the amount of frictional force they exert upon the drum surface 6, thereby transmitting a constant torque to the driven member 10, at or above a predetermined speed. The constant torque delivered to the driven member 10, by reason of the decreased frictional force of the shoes upon the flange 6 due to centrifugal force, causes a slippage between the shoes and the drum surface 6. This slippage, when the device has been operated for any length of time, generates large quantities of heat. Unless this heat is dissipated in some manner, the heat will be conducted through the drum portion and hub of the driving member 1 into the bearings 12, thus causing the lubricant in the bearings to be burned off which, in turn, will initiate a failure in the bearings which are critical elements in a device of this nature.

In my invention, this heat generated by the slippage will be dissipated in the following manner. When the driving member 1 is rotating, the vanes 23 act as an intake fan and draw air through the apertures 17 which communicate by groove 24 with the bores 7 to form a first or inner, axially extending flow channel, as well as through the central hole 18, the central bore 4 and the passages 8 which communicate to form a second or outer, axially extending flow channel. This arrangement provides an air flow through the driven member, within, i. e., radially inwardly of the bearing 12 and about, i. e., radially outwardly of the bearing 12, to dissipate the heat generated in the driving member by the slippage of the friction shoes, thereby minimizing the possibility of a heat transfer taking place to the bearings 12.

What I claim is:

1. A self-cooling torque metering clutch comprising a driving member and a driven member, means for affecting a frictional driving engagement between said members, said driving member having a central bore in axial alignment with a central hole formed in said driven member, a plurality of passages obliquely arranged in said driving member and intersecting said central bore; said passages, central bore and central hole all communicating to form a flow channel; a plurality of axial bores in said driving member in spaced concentric relation to said central bore and circumferentially offset with respect to said oblique passages, a plurality of circumferentially spaced apertures in said driven member, said apertures and axial bores communicating to form another flow channel, and integral means on said driving member whereby, when said driving member is rotated, an air flow is created through said flow channels.

2. A self-ventilating torque metering clutch comprising a driving member having a forwardly extending central hub portion and an external drum surface, said hub having a central axial bore, said driving member being formed with an annular groove intermediate said drum surface and said central bore, a driven member journalled on a bearing mounted on said outer hub portion, said driven member having a rearwardly extending flange surrounding said drum surface and carrying a plurality of friction shoes for affecting a frictional driving engagement between said driven and driving members, said hub portion having a plurality of circumferentially spaced axially extending bores arranged in spaced concentric relation to said central bore and intersecting said groove, a plurality of passages extending through said driving member and arranged in oblique fashion with said central bore and communicating therewith, a plurality of circumferentially spaced apertures in said driven member in axial alignment with said friction shoes, said apertures communicating with said groove and forming, in conjunction with said concentrically arranged axial bores, a first flow channel, a central hole in said driven member in communication with said central bore and forming, in conjunction with said oblique passages in said driving member, a second flow channel, said driving member further having a rearwardly extending annular flange having a plurality of radial vanes on its inner surface, said vanes operating as an intake fan when the driving member is rotated, whereby air is drawn through said first and second flow channels to dissipate friction generated heat in the driving member.

3. A self-cooling torque metering speed control clutch comprising a driving member, a bearing mounted on said driving member, a driven member mounted on said bearing for rotation relative to said driving member, a series of friction elements carried by said driven member and operable to frictionally engage said driving member, said driving and driven members being formed with inner and outer axially extending air-flow channels, said inner channel being disposed to conduct an air flow through said clutch radially inwardly from said bearing, and said outer channel being disposed to conduct an air flow through said clutch radially outwardly from said bearing, and a suction fan carried by said driving member and operable to create an air flow through said channels in order to dissipate the heat conducted to the inner and outer races of said bearing in said clutch.

4. A clutch as defined in claim 1, wherein said driving member is formed with a hub encircled by a drum surface, said hub having a central bore, said plurality of axially extending bores, and said oblique passages formed therein.

5. A clutch as defined in claim 1, wherein said integral means on said driving member for creating said air flow comprises a plurality of radially inwardly extending vanes which act as an intake fan to draw air through said flow channels when said driving member is rotated, said vanes being mounted on the inner surface of an offset flange on said driving member and extending axially beyond said offset flange so as to act as a fan.

References Cited in the file of this patent

UNITED STATES PATENTS

| | | |
|---|---|---|
| 2,607,445 | Rausenberger | Aug. 19, 1952 |
| 2,747,711 | Schmitter et al. | May 29, 1956 |
| 2,762,482 | Davis | Sept. 11, 1956 |

OTHER REFERENCES

Automotive Industries, Special Frictional Couplings Responsive to Speed and Torque, October 1, 1954, pp. 54, 55 and 116.